Dec. 22, 1964  S. E. FAREKAS  3,162,059
POWER FEED CLUTCH MECHANISM
Filed Oct. 8, 1962  2 Sheets-Sheet 1

INVENTOR.
Stephen Emery Farekas
BY Walter J. Schlegel, Jr.
Atty.

Witness:
Robert A. Brown

Dec. 22, 1964  S. E. FAREKAS  3,162,059
POWER FEED CLUTCH MECHANISM
Filed Oct. 8, 1962  2 Sheets-Sheet 2

Witness:
Robert A. Brown

INVENTOR.
Stephen Emery Farekas
BY Walter L. Schlegel, Jr.
Atty.

United States Patent Office 3,162,059
Patented Dec. 22, 1964

3,162,059
POWER FEED CLUTCH MECHANISM
Stephen Emery Farkas, South Bend, Ind., assignor to Amsted Industries Incorporated, Chicago, Ill., a corporation of New Jersey
Filed Oct. 8, 1962, Ser. No. 229,072
8 Claims. (Cl. 74—371)

This invention relates to machine tools, such as lathes, and more particularly to mechanisms associated with such machine tools and used for directional feed selection of component parts thereof.

In the past it has been common practice to provide various mechanisms to selectively position gear trains in forward, reverse, or neutral position as related to the directional travel of a carriage upon the bed of a lathe. However, such positioning devices have proved not to be entirely satisfactory, in most cases, because of excessive frictional wear occurring between members of the gear-positioning parts.

Accordingly, an object of this invention is to provide a mechanism which will properly position a selector gear in engagement with a cooperating driving gear.

Another object is to provide a mechanism which will not only properly position a selector gear but also function to maintain said gear in its proper position.

A further object is to provide a mechanism which will accommodate the movement of said selector gear to various index positions.

Other objects and advantages of this invention will become apparent when reference is made to the following description and accompanying drawings wherein.

Figure 1:
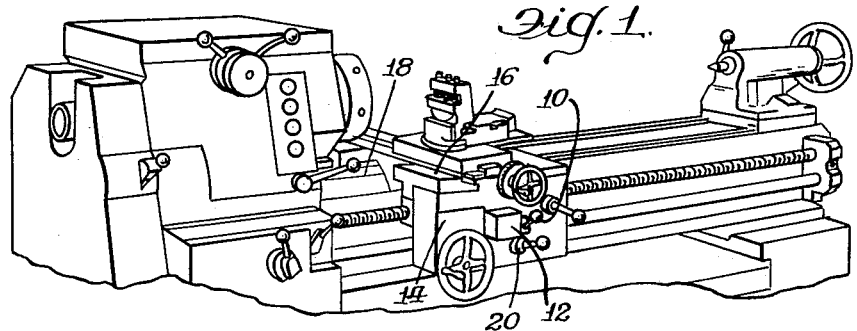
FIGURE 1 is a perspective view of a lathe of which the invention is a component part.

Referring to FIGURE 1 a feed selector lever 10 is rotatably journalled in a housing 12 mounted upon, as by screws 13 (FIGS. 2-4) an apron 14 suspended from a carriage 16 slideably mounted in the usual manner upon a bed 18. Lever 10 is operatively connected to a shift rack mechanism, hereinafter described, which is selectively positionable to transmit rotative motion from a power source to a plurality of gear train arrangements. A feed reverse lever 20 is rotatably journalled in said apron 14 to selectively engage said power source and thereby transfer a forward, reverse or no rotative motion to said gear train arrangements.

Figure 2:
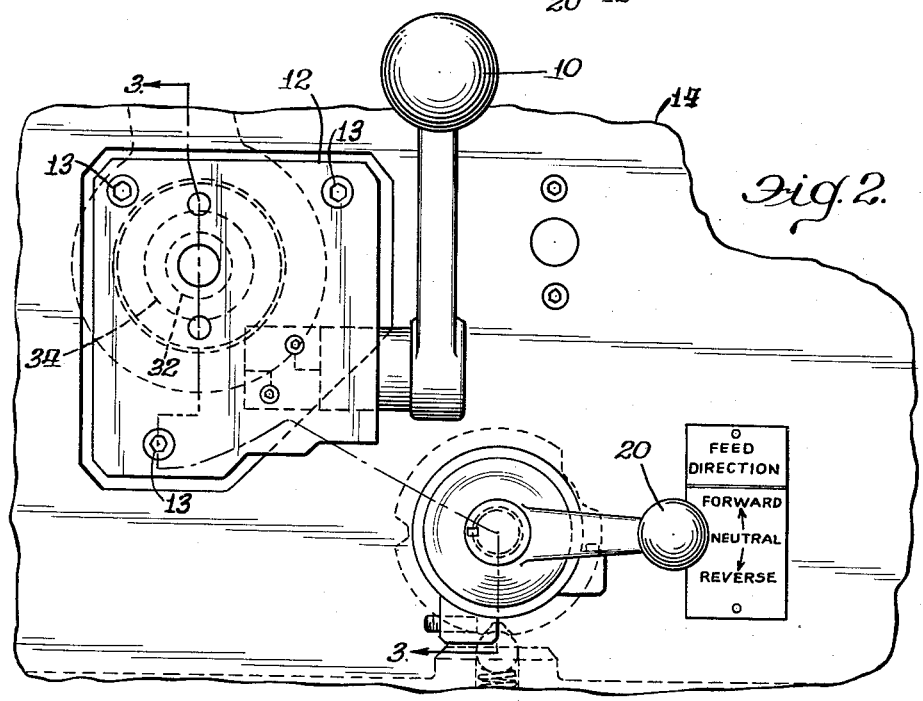
FIGURE 2 is a fragmentary front elevational view of a lathe apron showing the exterior operating lever arrangement.
Figure 4:
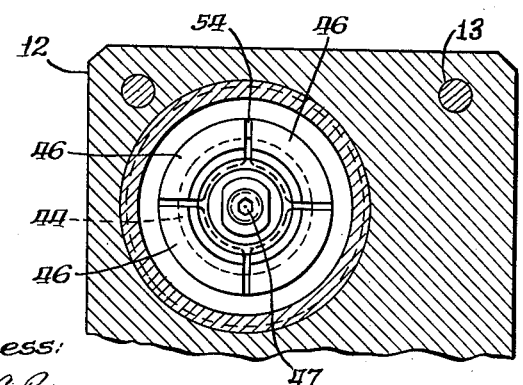
FIGURE 4 is a fragmentary cross-sectional view taken substantially on the plane of line 4—4 of FIGURE 3.
Figure 3:
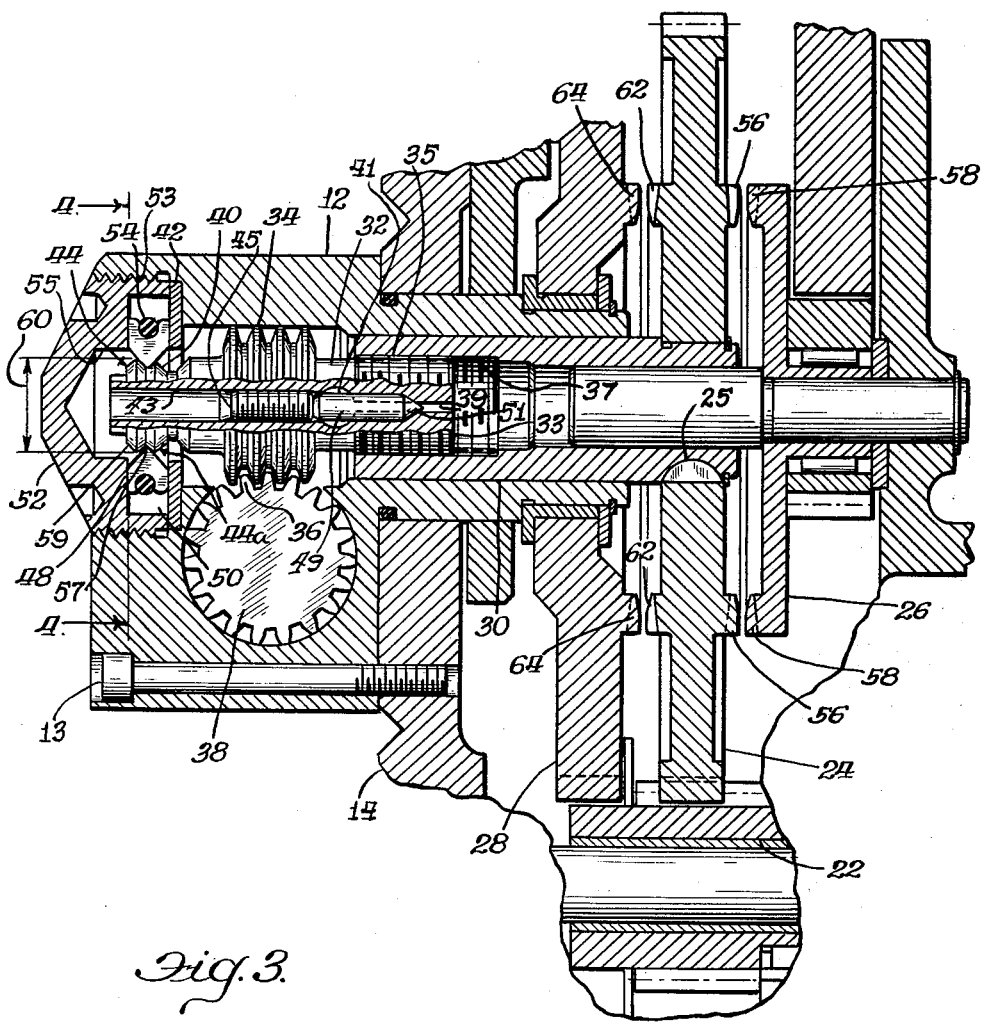
FIGURE 3 is a fragmentary cross-sectional view taken substantially on line 3—3 of FIGURE 2 and looking in the direction of the arrows.

Referring to FIGURES 2, 3, and 4, lever 20 may be selectively positioned to transmit rotative motion from shaft 22 to a feed selector gear 24, which is engageable with either longitudinal feed clutch 26 or cross feed gear 28. Said feed selector gear 24 is keyed as at 25 to selector gear shaft 30 rotatably journalled within said housing 12. Said selector gear shaft 30 is suitably secured to a feed selector shift rack 32, so as to be in axial alignment therewith.

Preferably the rack comprises a cylindrical boss 33 in threaded engagement as at 35 with the shaft 30 within a cylindrical bore 37 thereof complementary to the threaded boss 33. The boss 33 is bisected by a slot 39 which communicates with a transverse hole 41 through the rack. The rack also comprises a longitudinal bore 43 within which is threaded a set screw 45 having a wrench engaging socket 47 (FIG. 4) by means of which the set screw 45 may be tightened against a pin 49 having a tapered nose 51 which spreads the top and bottom segments of the boss 33 to tightly interlock its external threads with the internal threads of the shaft 30.

A plurality of axially spaced teeth 34 are formed circumferentially about a portion of said feed selector shift rack 32 and are adapted to engage gear teeth 36 of a rack positioning or pinion gear 38 rotatably journalled in the housing 12 and operated by feed selector lever 10.

The rack 32, as best seen in FIGURE 3 is elongated and extends through an annular spacing member 42 disposed within a threaded opening 53 of the housing 12 and clamped thereagainst by a cover 52 threaded in the opening. The cover is recessed at 50 to define with the member 42 an annular chamber within which is positioned a detent assembly 48 comprising a plurality of spaced detent segments 46 surrounding the rack 32 and disposed radially outwardly of its longitudinal axis. The segments 46 are snugly confined between and are slideably guided by the member 42 and the cover 52 during movement of said detent members as hereinafter described. It may also be noted that the cover 52 has a bore 55 within which the outer end of the rack 32 moves as it is actuated lengthwise thereof as hereinafter described. The segments 46 are surrounded by a resilient member, such as an O ring 54 which urges the segments inwardly to engage one or both of a pair of abutments 44 and 44a formed on the rack 32 and both tapering radially outwardly from its longitudinal axis, so that the abutments 44 and 44a define an annular V-shaped groove 57 therebetween. The detent members are tapered radially inwardly toward the longitudinal axis of the rack 32 and are received within the V-shaped groove 57 as shown in FIGURE 3 when the rack 32 and the feed selector gear 24 actuated thereby are in the neutral position shown in FIGURE 3 with the gear 24 spaced from the longitudinal feed clutch 26 and the cross feed gear 28.

In order to effect engagement of feed selector gear 24 with longitudinal feed clutch 26, handle 10 is rotated upwardly in a clockwise direction. Said rotation imparts a like turning force on rack positioning gear 38, which because of the coaction of teeth 36 and teeth 34, of feed selector shift rack 32, causes axial movement of the feed selector gear 24. Said rotation is continued until teeth 56 of feed selector gear 24 are properly engaged with teeth 58 of longitudinal feed clutch 26 thereby allowing rotative motion from said power source to be imparted to a gear train arrangement of which longitudinal feed clutch 26 is a part.

Concurrently, as the feed selector shift rack 32 is moved axially by the rotation of handle 10 the abutment member 44 exerts a force against the segments 46 of detent 48. The segments 46, being resiliently expandable, move radially outward allowing the crest diameter 60 of abutment member 44 to axially slide past segments 46 of the detent 48. As said crest diameter 60 of abutment member 44 passes through the opening formed by expanded segments 46, the resilient or springlike member 54 urges the segments radially inward to their original annularly disposed position wherein they engage surface 59 of abutment 44. Thus, the inwardly urged segments 46 of the detent 48 provide the means whereby the feed selector gear 24 is held in driving engagement with the longitudinal feed clutch 26.

In similar fashion, but by rotating handle 10 in a counterclockwise direction, from neutral position, gear teeth 62 of feed selector gear 24 engage the gear teeth 64 of cross feed gear 28 and impart rotative motion to a gear train arrangement of which cross feed gear 28 is now a part. As hereinbefore described the detent 48 expands and contracts during axial movement of the feed selector shift rack 32, segments 46 now engage surface 40 of abutment 44a and thereby provide the means whereby feed selector gear 24 is held in driving engagement with cross feed gear 28.

Thus, the detent 48 provides the means whereby the feed selector gear 24 can be maintained in driving engagement with either the longitudinal feed clutch 26 or the cross feed gear 28, after axial index movement of the feed selector shift rack 32 has been effected by rotation of handle 10.

In assembling the novel device, the feed selector gear 24 is held in its neutral position while the rack boss 33 is threaded into the bore 37 with the spacer 42 sleeved over the rack 32 and the detent assembly 48 positioned within the V-groove 57. When the spacer 42 and detent assembly 48 reach their positions as shown in FIGURE 3, the set screw is tightened to lock the boss 33 in tight threaded engagement with the shaft 30. The pinion gear teeth 36 are then properly mated with the rack teeth 34, and the cover 52 is threaded into the opening 53 until the cover tightly clamps the spacer 42 against the housing 12 and snugly confines the detent assembly 48 as shown in FIGURE 3.

Although but one embodiment of the invention has been disclosed and described, it is apparent that other embodiments and modifications are possible within the scope of the appended claims.

I claim:

1. In a machine having a frame and a moveable gear keyed on a shaft journalled in the frame and moveable in opposite directions axially thereof to alternately engage said gear with gears spaced therefrom and to move said moveable gear to a neutral position between said spaced gears; the combination of an annulus on said shaft, said annulus tapering radially outwardly to define a pair of annular surfaces which converge toward each other radially outwardly from the longitudinal axis of said shaft, an annular groove in the outer perimeter of said annulus between said surfaces, said groove tapering toward said axis to define a pair of surfaces which diverge from each other radially outwardly from said axis, an annular recess in the frame surrounding said groove, an annular, resilient detent in said recess spaced from its radially outer perimeter, said detent having its radially inner perimeter tapering toward said axis and engaged in said groove to yieldingly hold said moveable gear in neutral position, said inner perimeter, when engaged with one of said converging surfaces, yieldably holding said moveable gear in meshed engagement with one of said spaced gears, and said inner perimeter, when engaged with the other of said converging surfaces, yieldably holding said moveable gear in meshed engagement with the other of said spaced gears, an annular rack on said shaft having spaced grooves defining annular teeth spaced from each other along said axis, and a pinion having teeth engaged with the rack teeth to accommodate rotation of the shaft on said axis without driving the pinion and to accommodate movement of the shaft in either direction along said axis in response to rotation of the pinion.

2. A machine tool clutch arrangement, comprising a housing, an axially moveable and rotatable shaft within said housing, a drive gear secured to said shaft so as to be axially and angularly moveable therewith, a pair of oppositely disposed driven gears within said housing adapted to be at times engaged with said drive gear, a plurality of annular teeth formed about said shaft, a pinion gear in engagement with said annular teeth, a lever operatively connected to said pinion gear for actuation thereof so as to axially position said shaft, indexing means for maintaining said shaft in a plurality of predetermined axial positions, said indexing means comprising a pair of abutment members circumferentially formed about and axially spaced on said shaft, each of said abutment members being formed to provide oppositely directed and intersecting conical abutment surfaces, a plurality of arresting segments slideably received within said housing located generally about said abutment members, said segments being positioned within said housing in a manner enabling generally radial movement thereof relative to the axis of said shaft, an inner peripheral edge of said segments being defined by two inclined surfaces converging in a direction toward the axis of said shaft so as to have complementary angles with respect to said abutment surfaces, and a resilient member located about the outer periphery of said segments urging said segments in a generally radial direction toward the axis of said shaft against the abutment surfaces, said inclined surfaces being effective when simultaneously contacting two of said abutment surfaces to maintain said shaft and drive gear in disengagement from both of said driven gears and being effective when abutting against one of the other of said abutment surfaces to maintain said drive gear in engagement with one of the driven gears.

3. A machine tool clutch arrangement, comprising a housing, an axially moveable and rotatable shaft within said housing, a drive gear secured to said shaft so as to be axially and angularly moveable therewith, a pair of spaced driven gears within said housing adapted to be at times engaged with said drive gear, a plurality of annular teeth formed about said shaft, manually operated means engaging said teeth for axially moving said shaft, indexing means for maintaining said shaft in a plurality of predetermined axial positions, said indexing means comprising a pair of abutment members circumferentially formed about and axially spaced on said shaft, each of said abutment members being formed to provide oppositely directed and intersecting conical abutment surfaces, a plurality of arresting segments slideably received within said housing located generally about said abutment members, said segments being positioned within said housing in a manner enabling generally radial movement thereof relative to the axis of said shaft, an inner peripheral edge of said segments being defined by two inclined surfaces converging in a direction toward the axis of said shaft so as to have complementary angles with respect to said abutment surfaces, and a resilient member located about the outer periphery of said segments urging said segments in a generally radial direction toward the axis of said shaft against the abutment surfaces, said inclined surfaces being effective when simultaneously contacting two of said abutment surfaces to maintain said shaft and drive gear in disengagement from both of said driven gears and being effective when abutting against one of the other of said abutment surfaces to maintain said drive gear in engagement with one of the driven gears.

4. A machine tool clutch arrangement, comprising a housing, an axially moveable and rotatable shaft within said housing, a drive gear secured to said shaft so as to be axially and angularly moveable therewith, a pair of spaced driven gears within said housing adapted to be at times engaged with said drive gear, a plurality of annular teeth formed about said shaft, manually operated means engaging said teeth for axially moving said shaft, indexing means for maintaining said shaft in any one of a plurality of predetermined axial positions, said indexing means comprising an annular abutment member formed on said shaft, a first plurality of annular inclined abutment surfaces formed on said abutment member, a restraining member received within said housing and disposed in a direction generally radial to said annular abutment member, a second plurality of inclined surfaces formed on said restraining member, resilient means urging said restraining member toward the axis of said shaft so as to cause at least some of said first and second inclined surfaces to contact each other, said restraining member being effective to maintain said shaft and drive gear in disengagement from both of said driven gears when a plurality of said second inclined surfaces simultaneously contact a plurality of said first inclined surfaces and said restraining member being effective to maintain said drive gear in engagement with one of said driven gears when only one of said plurality of first inclined surfaces is in contact with only one of said plurality of second inclined surfaces.

5. A machine tool clutch arrangement, comprising a housing, an axially moveable and rotatable shaft within said housing, a drive gear secured to said shaft so as to be axially and angularly moveable therewith, a pair of oppositely disposed driven gears within said housing adapted to be at times engaged with said drive gear, a plurality of annular teeth formed about said shaft so as to axially position said shaft, a pinion gear in engagement with said annular teeth, a lever operatively connected to said pinion gear for actuation thereof, indexing means for maintaining said shaft in a plurality of predetermined axial positions, said indexing means comprising an abutment member circumferentially formed about said shaft, said abutment member being formed to provide oppositely directed and intersecting conical abutment surfaces, a restraining member received within said housing and disposed in a direction generally radial to said abutment member, a plurality of inclined surfaces formed on said restraining member, resilient means urging said restraining member toward the axis of said shaft, said restraining member being effective when said abutment surfaces contact a first pair of said plurality of inclined surfaces to maintain said gear in engagement with one of said driven gears and being effective when said abutment surfaces contact a second pair of said plurality of inclined surfaces to maintain said gear in engagement with the other of said driven gears and being effective when said abutment surfaces contact a third pair of said plurality of inclined surfaces to maintain said drive gear in disengagement from both of said driven gears.

6. In a machine having a feed selector gear keyed to an axially moveable and rotatable shaft for selective engagement with first and second driven gears or for disengagement from both said driven gears, circular teeth formed on said shaft for engagement with manually actuated selector means, a first annular ring formed about said shaft, a second annular ring formed about said shaft, said first and second rings being positioned relatively close to each other to form an annular recess therebetween, resiliently positionable locating means positioned about said shaft in a manner preventing movement thereof in the axial direction of said shaft, said locating means being effective to abut against only said first ring when said shaft is moved to an axial position whereby said selector gear engages said first driven gear and abut against only said second ring when said selector gear engages said second driven gear and to abut against both said first and second rings when said selector gear is in disengagement with both said driven gears.

7. A lathe, comprising a carriage moveable along the bed of the lathe, an apron depending from said carriage, said apron being formed to provide a frame, a housing located on said frame, a shaft journalled at a plurality of points within said housing, said shaft being moveable in a horizontal axial direction and rotatable in an angular direction normal to its horizontal axis, a feed gear secured to said shaft, said gear being formed to provide gear teeth on both of its axially disposed opposite sides, a cross-slide gear spaced from said feed gear, said cross-slide gear being formed to provide gear teeth which can be engaged with the gear teeth formed on one side of said feed gear, a clutch gear spaced from said feed gear, said clutch gear being formed to provide gear teeth which can be engaged with the gear teeth formed on the opposite side of said feed gear, a circular member formed about and near an end portion of said shaft, said circular member being formed to provide a pair of circumferential ridges, each of said ridges being defined by a pair of acute angled surfaces converging in a direction outwardly from the axis of said shaft, a generally circumferential groove defined by one angled surface of one of said ridges converging with one angled surface of the other of said ridges in a direction inwardly toward the center of said shaft, a detent member received within said housing and located generally about said circular member, said detent being formed to provide a plurality of segments moveable in a general radial direction with respect to said shaft, said segments being formed to provide an inner peripheral edge defined by a pair of slanted surfaces converging toward the axis of the shaft, said slanted surfaces being formed to engage the angled surfaces comprising said groove or with one of the other of said angled surfaces of one of said ridges, a resilient member positioned generally about and urging said segments in a radial direction toward the axis of the shaft, a gear rack formed about a portion of said shaft, said rack being formed to provide a plurality of teeth in planes generally perpendicular to the axis of said shaft, a pinion gear located in said housing, said pinion gear being formed to provide teeth engaged with the teeth of said rack, and a manually operated handle attached to and being effective to rotate said pinion gear, said handle being effective to move the shaft in an axial direction so that said slanted surfaces engage said groove to maintain said feed gear spaced between said cross-slide gear and said clutch gear, and being effective to move the shaft in an axial direction so that one of said slanted surfaces engages one of said angled surfaces of one of said ridges to maintain the gear teeth formed on one side of said feed gear engaged with the gear teeth of said cross-slide gear, said handle also being effective to move the shaft in an axial direction so that the other of said slanted surfaces engages one of said angled surfaces of the other of said ridges to maintain the gear teeth formed on the opposite side of said feed gear engaged with the gear teeth of said clutch gear.

8. In a machine having a selector gear keyed to an axially movable and rotatable shaft for selective engagement with first and second gears or for disengagement from both of said gears, circular teeth formed on said shaft for engagement with gear selector means, first and second annular rings formed on said shaft, said rings being positioned relatively close to each other to form an annular recess therebetween, resiliently positionable locating means adjacent said shaft, said locating means being effective to abut against only said first ring when said selector gear is engaging said first gear and effective to abut against only said second ring when said selector gear is engaging said second gear, and effective to abut against both said first and second rings when said selector gear is disengaged from both said first and second gears.

References Cited in the file of this patent
UNITED STATES PATENTS

| | | |
|---|---|---|
| 2,592,982 | Violet | Apr. 15, 1952 |
| 3,053,103 | McAninch et al. | Sept. 11, 1962 |